Patented Jan. 21, 1936

2,028,399

UNITED STATES PATENT OFFICE 2,028,399

PLASTIC COMPOSITIONS AND METHOD OF MAKING THE SAME

Lucas P. Kyrides, Webster Groves, Mo., assignor, by mesne assignments, to Monsanto Chemical Company, a corporation of Delaware No Drawing. Application February 20, 1933, Serial No. 657,674

7 Claims. (Cl. 106—37)

This invention relates to the manufacture of film or plastic compositions which embody nitrocellulose as their base and it has particular relation to modifying agents to be used in conjunction with the nitrocellulose for the purpose of imparting desired properties and characteristics to the ultimate cellulose product.

The present invention contemplates the utilization of a class of organic compositions which in general are liquid or comparatively low melting solids characterized by their relative non-volatility under ordinary conditions, their stability toward atmospheric influences, and their ability to impart inordinate impermeability and resistance to water, as well as an unusual quality of resistance to the action of actinic ray such as is present in ordinary sunlight.

Briefly stated, the products contemplated herein are the hydrogenated or partly hydrogenated phenyl substituted phenols, examples of which include ortho phenyl phenol, para phenyl phenol, cresyl cresols, etc.

The compositions from which these hydrogenated or partially hydrogenated products are produced are in general the unsubstituted phenyl phenols including the otherwise unsubstituted alkyl substituted phenyl phenols. Hydrogenation of these compositions results in a cyclohexylcyclohexanol having the formula $$C_6H_{11}C_6H_{10}OH$$

and its homologues. Similarly, partial hydrogenation of a phenyl phenol results in phenyl cyclohexanol having the formula $C_6H_5C_6H_{10}OH$ and its homologues. The present invention contemplates the use not only of these hydrogenated and partially hydrogenated products or mixtures thereof but also the esters and ketones thereof.

Hydrogenated para phenyl phenol may be produced conveniently by subjecting the phenyl phenol to gaseous hydrogen in the presence of a hydrogenating catalyst such as nickel. The reaction proceeds smoothly at a temperature of 200° C.–220° C. and a hydrogen pressure of 50–125 atmospheres. These conditions may be varied depending upon the nature, activity and age of the catalyst as is well understood by those skilled in the art.

To produce the cyclohexylcyclohexanol type of product, that is, the completely hydrogenated product, the hydrogenation is permitted to proceed until the consumption of hydrogen has subsided. The catalyst is then separated from the reacted mixture and the product is purified in any suitable manner, such, for example, as by fractional distillation. It will be found to consist essentially of para cyclohexylcyclohexanol. The reaction may be represented:

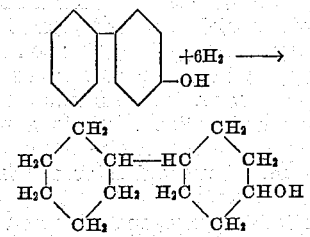

In case ortho phenyl phenol or a mixture of ortho and para phenyl phenols is employed, one obtains the corresponding cyclohexylcyclohexanol or mixtures thereof respectively. In like manner the homologues are produced.

The partially hydrogenated phenyl phenols and their homologues are obtained by interrupting the hydrogenation at a predetermined point, preferably after the aromatic nucleus embodying the phenol group has been saturated or hydrogenated. In general, the hydrogenation of the phenol group containing nucleus precedes the hydrogenation of the phenyl group of the phenyl phenol molecule.

If the ketone is desired it may be formed conveniently by releasing the hydrogen in the hydrogenation vessel after the consumption of hydrogen has subsided or has proceeded to the desired degree of hydrogenation, and maintaining a temperature of 200° C.–250° C. Under these conditions the catalyst functions to dehydrogenate the para-cyclohexylcyclohexanol or para-phenyl cyclohexanol to form para-cyclohexylcyclohexanone or para-phenyl cyclohexanone as the case may be, having the probable formula:

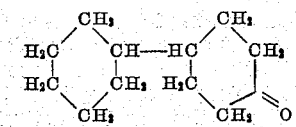

and

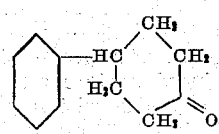

respectively.

Esters of the foregoing cyclic alcohols may be prepared conveniently by the usual methods of esterification. Thus, for example, the acetic acid ester may be formed conveniently by reacting the hydrogenated phenyl phenol with a slight excess of acetic anhydride, or the reaction may be effected by condensing the cyclohexylcyclohexanol with the acid.

A desirable class of ester compositions consists of the esters of dicarboxylic acids or the mixed esters which may be made conveniently by heating a molar proportion of the dicarboxylic acid anhydride, such as phthalic anhydride or succinic anhydride with an equivalent molar proportion of the cyclohexylcyclohexanol. The reaction may be represented:

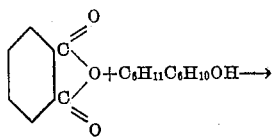

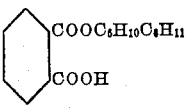

The half ester acid so produced is then caused to react further with an additional molar quantity of another hydrogenated phenyl phenol or may be reacted under esterifying conditions with a molar quantity of another alcohol, for example, methyl, ethyl, propyl, butyl, benzyl alcohols. In lieu of the simple alkyl alcohols a mono alkyl ether of ethylene glycol may be substituted. In each case a mixed neutral ester of the dicarboxylic acid is obtained.

The partially hydrogenated phenyl phenols may be esterified in a manner analogous to the completely saturated or hydrogenated products. Thus, one may prepare the acetic acid ester of phenyl cyclohexanol by reacting phenyl cyclohexanol with acetic anhydride.

In lieu of the acetic acid esters referred to in the foregoing description, one may form neutral esters of other organic carboxylic acids including propionic acid, butyric acid, oxalic acid, benzoic acid, phthalic acid and succinic acid.

The compositions described herein are utilized in a manner analogous to that employed in the case of dibutyl phthalate or camphor, containing nitrocellulose compositions.

They may likewise be used advantageously as modifying agents in the alkyd type resins wherein they displace in part the glycerol which would otherwise be required, and impart a desirable plastic effect to the ultimate product which product may itself be utilized as a nitrocellulose lacquer resin or a varnish. The ketones produced condense with aldehydes such as formaldehyde to form valuable resins having properties analogous to those obtained by the condensation of cyclohexanone with aldehydes, as, for example, formaldehyde.

The following examples will serve to illustrate embodiments of the present invention, it being understood that these are merely exemplary and do not limit their general applicability as camphor, dibutyl phthalate and dimethyl phthalate substitutes.

*Example I.*—Sufficient nitrocellulose is dissolved in a mixture of approximately equal parts by volume of butyl acetate and toluol to produce a solution of a consistency which may be desired and which will flow and form into a uniform film. Incorporate in this mixture 25% by weight based on the dry nitrocellulose of para cyclohexylcyclohexanol. Spread the solution on a smooth surface to form a uniform layer and permit the acetatetoluol solvent to evaporate slowly. The resulting film will be found to be tough, flexible and markedly resistant to permeation of water or moisture, as well as to action of actinic ray.

*Example II.*—Substitute an equal proportion by weight of the acetic acid ester of para cyclohexylcyclohexanol for the para cyclohexylcyclohexanol provided for in the previous example. The characteristics of the film product are much the same as those made from the unesterified material.

*Example III.*—Substitute an equal proportion by weight of cyclohexylcyclohexanone for the cyclohexylcyclohexanol provided for in Example I. The water resistance and compatibility of the product are excellent.

*Example IV.*—In lieu of the para cyclohexylcyclohexanol and its esters and corresponding ketone substitute the corresponding ortho isomer or a mixture of ortho and para isomers.

*Example V.*—In lieu of the cyclohexylcyclohexanol of Example I substitute an equal proportion by weight of a neutral phthalic acid ester, one carboxyl group of which is esterified by an alkyl alcohol or ether substituted alkyl alcohol and the other carboxyl group of which is esterified by a cyclohexylcyclohexanol.

In lieu of the toluol-butyl acetate solvent one may substitute a composite solvent embodying a wide variety of relatively low boiling compositions as is well understood by those skilled in the art. One such composite solvent may consist of a mixture which contains the following ratio of ingredients:

25% active solvent such as ethyl acetate, butyl acetate, etc.
20% alcohol such as denatured alcohol, butyl alcohol, etc.
55% hydrocarbon such as benzol, toluol, etc.

It is to be understood that the nitrocellulose products to which the present invention is adapted include not only nitrocellulose films but contemplates their use in lacquers, enamels, moulding compositions, threads, etc.

From the foregoing description it will be evident that I have provided a novel class of camphor or resin substitutes which impart an inordinate degree of light fastness, water resistance and impermeability to a nitrocellulose product.

In the claims the expression "hydrogenated phenyl phenol" contemplates partially as well as completely hydrogenated mono-phenyl substituted phenols including alkyl substituted phenyl phenols, examples of which, in the case of hydrogenated para phenyl phenol, are para phenyl cyclohexanol and para cyclohexylcyclohexanol respectively.

It is to be understood that while specific methods of preparing the hydrogenated phenyl phenols and their derivatives have been set forth, the invention is not limited to the methods of preparation herein disclosed but contemplate other methods by which these products may be prepared.

What I claim is:

1. A nitrocellulose composition embodying a neutral ester of a dicarboxylic acid containing a cyclohexylcyclohexanol residue in at least one ester group.

2. A nitrocellulose composition embodying a neutral ester of a dicarboxylic acid in which at least one of the carboxyl groups is joined to a cyclohexylcyclohexanol.

3. A nitrocellulose composition embodying a residue consisting of diphenyl hydrogenated in at least one aryl nucleus, the hydrogenated nucleus containing a substituent selected from a class consisting of oxygen, hydroxy and hydroxy esterified by a carboxylic organic acid.

4. A nitrocellulose composition embodying a compound of the formula:

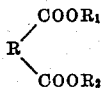

where R, $R_1$ and $R_2$ are hydrocarbon groups, at least one of the groups $R_1$ and $R_2$ being the residue obtained by esterifying the carboxyl group with a hydrogenated phenyl phenol.

5. The product as defined in claim 4 and further characterized in that the dicarboxylic acid is phthalic acid.

6. A nitrocellulose composition embodying a plasticizer consisting of the ester of a hydrogenated phenyl phenol and an aromatic carboxylic acid, said plasticizer being in an amount sufficient to increase substantially the flexibility of the composition.

7. A nitrocellulose composition embodying a plasticizer consisting of a neutral ester of hydrogenated phenyl phenol and phthalic acid, said plasticizer being present in an amount sufficient to increase substantially the flexibility of the composition.

LUCAS P. KYRIDES.